United States Patent [19]

Couchoud

[11] 4,210,740
[45] Jul. 1, 1980

[54] COPOLYESTERS PREPARED FROM PHOSPHORUS COMPOUNDS WHICH CAN BE SHAPED AND WHICH HAVE REDUCED FLAMMABILITY

[75] Inventor: Paul Couchoud, Dardilly, France

[73] Assignee: Rhone-Poulenc-Textile, Paris, France

[21] Appl. No.: 873,601

[22] Filed: Jan. 30, 1978

[30] Foreign Application Priority Data

Feb. 3, 1977 [FR] France ................... 77 03688

[51] Int. Cl.² ........................................... C08G 63/68
[52] U.S. Cl. ................... 528/167; 528/168; 528/169; 528/173; 528/287
[58] Field of Search ............... 528/167, 169, 287, 168, 528/173

[56] References Cited

U.S. PATENT DOCUMENTS

| | | | |
|---|---|---|---|
| 3,853,819 | 12/1974 | Herwig et al. | 528/287 |
| 3,962,194 | 6/1976 | Bollert et al. | 528/287 |
| 4,046,724 | 9/1977 | Kato et al. | 528/287 |

*Primary Examiner*—Lester L. Lee
*Attorney, Agent, or Firm*—Stevens, Davis, Miller & Mosher

[57] ABSTRACT

The present invention relates to copolyesters having high flame resistance, and comprising essentially 85% to 99.5% of repeating units of the formula —CO—R—CO—O—$R_1$—O—, in which R is an aromatic radical, and $R_1$ is a divalent aliphatic, cycloaliphatic or cyclanic radical, or a mixture of two or more of these radicals; at least 0.5% of units of the formula:

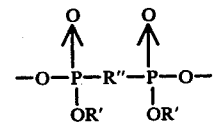

in which R' is a lower alkyl group, and R" is an aliphatic, aromatic or arylaliphatic radical;
and 0 to 14.5% of units produced from a compound of the formula:

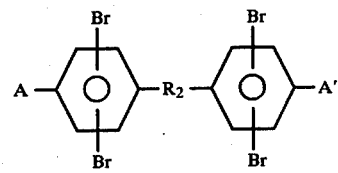

in which $R_2$ is zero or represents an

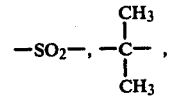

—$CH_2$— or —O— group, and A and A' represent either —CO—OX groups, in which X=H or a lower alkyl group, or —X'OH groups in which X'=a $(OCH_2—CH_2)$ group and n=1 to 10.

These copolyesters may be used advantageously for producing textile yarns and fibers, films, and molded or extruded articles.

17 Claims, No Drawings

COPOLYESTERS PREPARED FROM PHOSPHORUS COMPOUNDS WHICH CAN BE SHAPED AND WHICH HAVE REDUCED FLAMMABILITY

The present invention relates to phosphorus-containing copolyesters which may be readily shaped and which possess high flame resistance.

It also relates to a process for obtaining the said copolyesters having reduced flammability, as well as to shaped articles such as yarns, fibers and films, and molded or extruded articles, which are obtained from such copolyesters.

It is already known, according to U.S. Pat. No. 3,979,533, to use products of the formula:

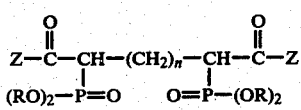

in which n=0 to 30, Z=OR, $NH_2$, NHR' or $AR'_2$, R=R', H, Na, K, $NH_4$ or $R'NH_3$, and R'=an alkyl, halogenoalkyl, aryl or hydroxyalkyl group, as a crease-resistant finish and flameproofing agent for cellulose. More specifically, according to this patent, it is known to use compounds of the formula:

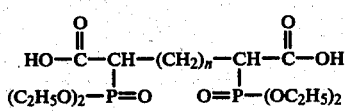

which can react with glycols to give polyester yarns. However, such compounds can only be used in small amounts in order to prevent any gelling.

It is also known, according to French Patent Application No. 2,204,658, to introduce into polyesters phosphonic acid compounds of the formula:

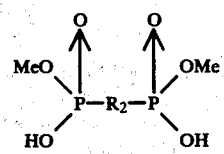

in which Me represents an alkali metal, and $R_2$ represents an alkylene, arylene or alkylenearylene radical. However, the introduction of these salts, the preparation of which is long and expensive, has the disadvantage of substantially increasing the melt viscosity of the polyesters. This in turn leads to mixtures which are difficult to spin and essentially restricts the use of such mixtures to molding.

French Patent Application No. 2,297,890 claims polyesters produced from a dicarboxylic acid or a derivative from which a corresponding ester is formed, from a diol or a derivative from which a corresponding ester is formed, and from a compound of a formula such as

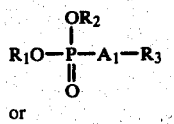

or

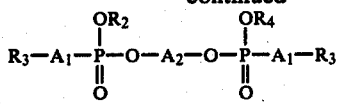

in which formulae $R_1$, $R_2$ and $R_4$ represent hydrogen atoms, or hydrocarbon radicals containing 1 to 18 carbon atoms, and $R_3$ represents a functional group from which an ester is formed, $A_1$ and $A_2$ being hydrocarbon radicals containing 1 to 12 carbon atoms. However, compounds of the formula (II) are not stable products in the polycondensation mixture; they are esters which are formed, during interchange, from two compounds of the formula (I) and which are transesterified at the groups

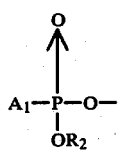

in order to re-form the compounds of the formula (I).

Furthermore, it is also known, according to French Patent No. 2,176,121, to prepare flame-resistant copolyesters which can be spun and which are produced from a diol, from a dicarboxylic acid or its diester, and from 1–20 mol % of a brominated diol of the general formula:

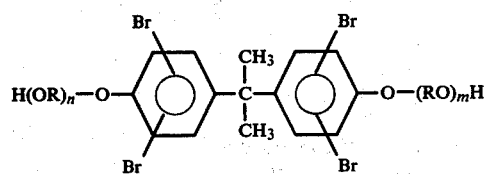

in which R is a divalent hydrocarbon radical containing 2 to 6 carbon atoms, and n and m are integers from 1 to 10. However, even in high proportions, such compounds do not make it possible to provide adequate flameproofing of the copolyesters thus prepared.

The present invention relates to copolyesters, having reduced flammability, which may be spun and made into a film and which comprise 85 to 99.5% of repeating units of the formula:

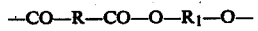

in which R is a divalent aromatic paraphenylene or 2,6-naphthylene radical which may be replaced, to the extent of at most 19.5 mol % relative to the sum of the radicals R, by another aromatic radical, such as the metaphenylene group, or an aliphatic radical containing 6 to 12 carbon atoms, and optionally, to the extent of at most 2 mol %, by a trifunctional or tetrafunctional radical, and in which $R_1$ is a divalent aliphatic, cycloaliphatic or cyclanic radical, or a mixture of two or more of these radicals, which may be replaced by at most 2 mol % of a trifunctional or tetrafunctional radical, provided that the sum of the trifunctional and tetrafunctional radicals R and/or $R_1$ does not exceed 0 to 2 mol % relative to all the acid reactants, at least 0.5% of units of the formula:

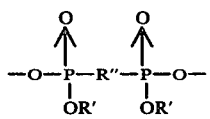

in which R' represents an alkyl radical containing 1 to 6 carbon atoms, and R" represents an aliphatic radical, preferably containing 2 to 4 carbon atoms, which is optionally branched and preferably saturated, one or more optionally substituted aromatic nuclei which are bonded in the 1,4-position or fused, or an arylaliphatic group which may contain one or more aromatic nuclei, the aliphatic chain of which preferably contains 1 to 4 carbon atoms and may contain heteroatoms such as —O— and —SO$_2$—, and which is optionally branched, and 0 to 14.5% of units produced from a brominated compound of the formula:

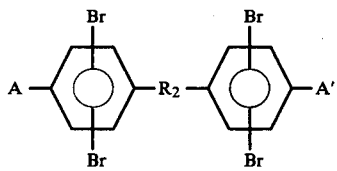

in which R$_2$ is zero or represents an

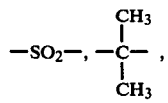

—CH$_2$— or —O— group, and A and A' represent either —CO—OX groups, in which X=H or a lower alkyl group, or X'OH groups in which X'=$+$OCH$_2$—CH$_2$$+_n$ and n=1 to 10.

The present invention also relates to a process for obtaining the said flame-resistant copolyesters by reaction, in the presence of known catalysts, of 80 to 99.5 mol %, relative to all the acid reactants, of an aromatic diacid such as terephthalic acid or 2,6-naphthalenedicarboxylic acid; 0 to 19.5 mol %, relative to all the acid reactants, of another aromatic diacid such as isophthalic acid or an aliphatic diacid containing 8 to 14 carbon atoms; 85.5 to 100 mol %, relative to all the acid reactants, of one or more aliphatic, cycloaliphatic or cyclanic diols; and, added at any time during the reaction, 0 to 2 mol %, relative to all the acid reactants, of a trifunctional or tetrafunctional branching agent of acid or alcohol character; at least 0.5 mol %, relative to all the acid reactants, of a product of the general formula:

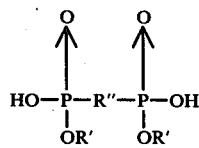

in which R' and R" have the same meanings as above; and 0 to 14.5 mol %, relative to all the acid reactants, of a brominated compound of the general formula:

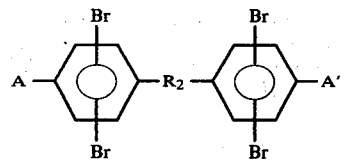

in which R$_2$ is zero or represents an

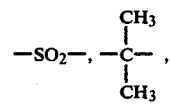

—CH$_2$— or —O— group, and A and A' are —CO—OH or X'—OH groups, X' representing a $+$OCH$_2$CH$_2$$+_n$ group in which n=1 to 10.

Another process for obtaining the flame-resistant copolyesters according to the present invention consists in carrying out an interchange between 80 to 99.5 mol %, relative to all the acid or ester reactants, of a lower alkyl diester of an aromatic acid such as terephthalic acid or 2,6-naphthalene-dicarboxylic acid; 0 to 19.5 mol %, relative to all the acid or ester reactants, of another lower alkyl diester of another aromatic diacid, such as isophthalic acid, or of an aliphatic diacid containing 8 to 14 carbon atoms; 85.5 to 100 mol %, relative to all the acid or ester reactants, of one or more aliphatic, cycloaliphatic or cyclanic diols; with the addition of 0 to 2 mol %, relative to all the acid or ester reactants, of a trifunctional or tetrafunctional branching agent of acid or alcohol character; at least 0.5 mol %, relative to all the acid or ester reactants, of a product of the general formula:

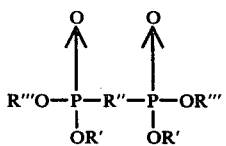

in which R' and R" have the same meanings as above, and R'" represents a hydrogen atom, or a lower alkyl group containing 1 to 6 carbon atoms; and 0 to 14.5 mol %, relative to all the acid or ester reactants, of a brominated compound of the general formula:

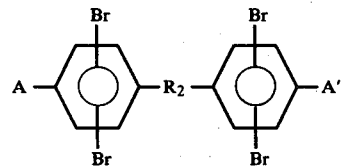

in which R$_2$ is zero or represents an

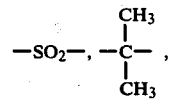

—CH$_2$— or —O— group, and A and A' are either —CO—OX groups, X representing a lower alkyl group or H, or X'OH groups in which X'=a $+$O—CH$_2$ $CH_2)_n$ group and n=1 to 10, followed by polycondensation in the usual manner, in the presence of known catalysts, the ester compounds being added at the start of the interchange, the acid compounds and the phosphonic compound being added at the end of the interchange, and the diol compounds being added at any time during the process.

Finally, the present invention also relates to the textile articles, such as yarns, fibers or films, which are obtained from the said copolyesters having reduced flammability, as well as to the articles which are molded or extruded from these copolyesters.

The direct esterification process, using a diacid as the starting material, is carried out at a temperature of at least 220° C., under a pressure which is greater than or equal to that necessary to keep the glycol in the liquid state, and in the presence of known catalysts.

In the second process, carried out using a lower alkyl diester as the starting material, the ester interchange is carried out at a temperature of at least 150° C. and in the presence of known catalysts, and, after addition of the acid and/or diol compounds and of the phosphorus-containing compound, the reaction mixture is then placed under a progressively higher vacuum, while the temperature is raised to at least 265° C. In both types of process, the phosphorus-containing and brominated compounds are added in the form of a glycolic solution.

Amongst the aromatic diacids, the one which is most commonly used, for obvious economic reasons, is terephthalic acid and, amongst the other aromatic or aliphatic diacids which may be used, in mixtures, up to the extent of 19.5 mol % relative to all the diacids, there may be mentioned isophthalic acid, sebacic acid, adific acid and the like.

Ethylene glycol is the preferred diol, but other diols, in particular cyclohexanedimethanol, hexane-1,6-diol, butane-1,4-diol, and the like may be used in mixtures.

Branching agents of acid, alcohol or alkyl ester character may be added to the extent of 0 to 2 mol %; trifunctional or tetrafunctional compounds, such as trimellitic acid, trimesic acid, trimethylolpropane, pentaerythrol and the like, are examples of these agents.

Brominated diols, and in particular the diol of the formula:

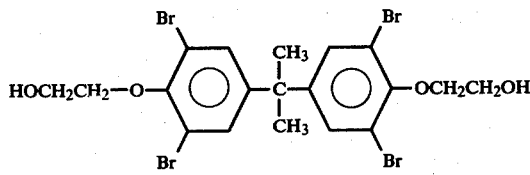

are preferred amongst the brominated compounds.

The preferred amount of brominated compound is generally between 2 and 8 mol %.

Examples of phosphonic compounds which may be used according to the present invention are tetraesters in which the R″ group is a paraphenylene, paraxylylene or 4,4′-diphenylene-sulphone group.

The preferred amounts of the phosphonic compound, for providing good flameproofing, depend on the proportion of brominated compound; they are generally between 2 and 10 mol % relative to the polymer.

It is surprising that the phosphonic compounds according to the present invention, which compounds are either tetraesters, or compounds which contain two acid groups and two ester groups and are therefore tetrafunctional, and which are used in the porportions indicated above, may be incorporated, in this form and in a linear manner, into the macromolecular polyester chains, that is to say without the compound being cleaved during the transesterification (as according to French Patent Application No. 2,297,890) and without causing crosslinking of the polyesters.

In fact, if a tetrafunctional compound such as pyromellitic acid or methyl pyromellitate is introduced during the polycondensation of the polyesters, crosslinking takes place, for proportions of crosslinking agent which are relatively low and which depend on the molecular weight of the polyester, in such a way that the reaction mixture solidifies and the product obtained becomes both infusible and insoluble and therefore impossible to shape.

The phosphonic compounds used in the present invention are therefore particularly valuable, because they make it possible to introduce a fairly high phosphorus content, with high efficiency, since they possess two phosphorus atoms per mol of compound. Furthermore, they may be used under the usual polycondensation conditions without degradation, whereas under identical polycondensation conditions, the compounds of the formula:

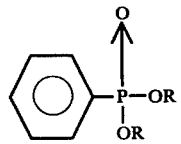

in which R is H or alkyl, preferably $CH_3$ or $C_2H_5$, undergo significant degradation. This degradation may be estimated by the fall in the percentage of phosphorus in the polymer relative to the amount introduced, by the presence of benzene in the distillates, and by the formation of infusible products in the polymer.

The incorporation of the phosphorus into the polyester chain, using compounds according to the present invention, may be proved by measuring the percentage of phosphorus in the polymer, after the polymer has been extracted with boiling water, dissolved in orthochlorophenol, and reprecipitated. The amount of phosphorus found in the polymer is essentially identical to the amount of phosphorus introduced in the form of the phosphonic compound according to the present invention. This is not the case for the same phosphonic compounds, of the type described in French Patent Application No. 2,204,658, which have two acid groups salified by alkali metal atoms (see the comparative Example 2 below).

The simultaneous presence of the phosphorus-containing compound and the brominated compound makes it possible to obtain copolyesters which are completely flame-resistant and, in particular, much more flame-resistant than if only one of the two compounds is used in an amount corresponding to the sum of the amounts of each of them.

In particular, a textile sample containing the phosphorus-containing compound or the brominated compound may exhibit a certain improvement in its fire resistance, for example in the LOI test, whereas its combustion is total when it is subject to the former AATCC 34–69 test. This is not the case for samples containing the phosphorus-containing compound and the brominated compound simultaneously.

The copolyesters according to the present invention may be spun in the usual manner, in the molten state, and they may be drawn in accordance with any process which is well known to those skilled in the art. They may also be used for producing films and extruded or molded articles. The yarns, films and molded or extruded articles which are produced from these copolyesters possess excellent flameproofing properties, in particular when they contain both a phosphorus-containing compound and a brominated compound.

When used by themselves or mixed with other natural, artificial or synthetic yarns or fibers, the yarns find a broad textile application in the field of hosiery and weaving.

The following examples, in which the parts are to be understood as meaning parts by weight unless otherwise stated, are given by way of indication, and without implying any limitation, in order still better to illustrate the invention.

The viscosity index is determined from the solution viscosity, measured at 25° C. in orthochlorophenol, using the formula:

$$VI = \frac{\text{specific viscosity} \times 1,000}{\text{concentration}}$$

in which the concentration is expressed in g/100 cm³.

The flameproofing tests used are as follows: the former AATCC 34/69 test, the LOI index (limiting concentration of oxygen for combustion) in accordance with ASTM Standard Specification B 2863-70, relating to plastic test-pieces, which has been modified and adapted to textile samples of dimensions 5×15 cm mounted on a rectangular frame, and the drip test which forms the subject of AFNOR French Standard Specification P 92505, "Building Test of the Reaction of Materials to Fire. Radiator Drip Test, Applicable to Fusible Materials (Complementary Test)".

EXAMPLE 1

A. 395.02 parts of dimethyl terephthalate, 310 parts of ethylene glycol, 0.16 part of antimony trioxide, and 0.19 part of manganese acetate are introduced into a reactor equipped with the usual heating and regulating devices.

The reaction mixture is heated until the methanol is eliminated; the temperature is then 213° C. When the reaction mixture reaches 225° C. and the glycol distils, 10.2 parts of a 0.7% strength glycolic solution of phosphorous acid are added, followed by 8.33 parts, dissolved in 50 parts of ethylene glycol, of diethyl ester of paraxylylenediphosphonic acid of the formula:

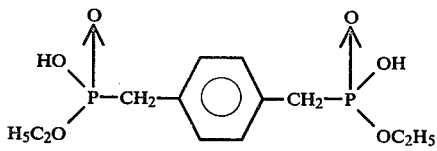

which has been prepared in a known manner.

After 1 hour 15 minutes, a progressively higher vacuum is applied down to 1.6 mm Hg, whilst the temperature rises to 299° C.

Polycondensation is carried out under a pressure of 1 mm Hg for 17 minutes at 299° C.

The polymer thus obtained possesses the following characteristics:

| | |
|---|---|
| VI | 700 |
| Viscosity in the molten state at 275° C. | 1,527 Poises |
| Percentage of phosphorus | 0.37 |
| Percentage of phosphorus after extraction with boiling water | 0.36 |
| Percentage of phosphorus after dissolution in orthochlorophenol and reprecipitation | 0.36 |

These figures prove that all of the phosphorus introduced in the form of the phosphonic compound is indeed incorporated into the copolyester thus prepared.

The copolyester is spun, using a spinneret possessing 23 holes of diameter 0.34 mm, and is drawn in a ratio of 3.5 over a heated finger at 80° C., and thereafter over a heated plate at 120° C.

A knitted fabric weighing 250 g/m² is produced with the yarn thus obtained and is subjected to the following flameproofing tests:

| | |
|---|---|
| LOI | 25 |
| AATCC: length destroyed | 26 cm |
| Drip test: burning drips | yes |

B. A yarn based on poly-(ethylene glycol) terephthalate, obtained under the same conditions but without the phosphonic compound, possesses the following fire-resistance characteristics:

| | |
|---|---|
| LOI | 23 |
| AATCC: length destroyed | 26 cm |
| Drip test: burning drips | yes |

EXAMPLE 2 (comparative)

Diethyl acid paraxylylenediphosphonate is treated with potassium acetate in a glycolic solution. This has the effect of salifying the acid groups of the compound used in Example 1 which then becomes:

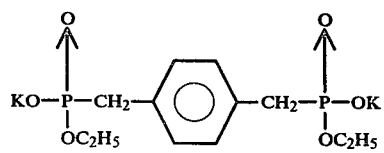

The polycondensation is carried out in the same manner as in Example 1.

The copolyester thus obtained possesses the following characteristics:

| | |
|---|---|
| VI | 635 |
| Viscosity in the molten state at 275° C. | 1,750 Poises |
| Phosphorus determined in the polymer | 0.31% |
| After extraction with boiling water | 0.15% |

It is thus seen that the phosphorus-containing compound has not been incorporated into the polymer chain.

EXAMPLE 3

395 parts of dimethyl terephthalate, 310 parts of ethylene glycol, 0.16 part of antimony trioxide, and 0.19 part of manganese acetate are introduced into a reactor equipped with the usual heating and regulating devices.

The reaction mixture is heated, whilst stirring, until the methanol is eliminated; the temperature is then 204° C. The temperature is then raised, and the glycol starts to distil at 218° C. 9 parts of tetraethyl paraxylylenediphosphonate of the formula:

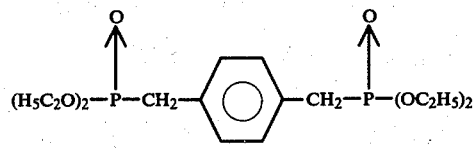

which is prepared in a known manner, are then added. The glycol continues to distil, and the temperature is raised to 222° C. 10.2 parts of a 0.7% strength glycolic solution of phosphorous acid are then added. At 254° C., after 1 hour 20 minutes, a progressively higher vacuum is applied down to 1 mm Hg over a period of 30 minutes, and the polycondensation is carried out for 25 minutes up to 290° C.

The copolyester thus obtained possesses the following characteristics:

| VI | 517 |
| --- | --- |
| Viscosity in the molten state at 275° C. | 1,488 Poises |
| Percentage of phosphorus | 0.32% |
| Percentage of phosphorus after extration with boiling water | 0.32% |

Therefore, it is again found in this case that all of the phosphorus introduced is incorporated into the polymer chain.

A yarn is prepared in a manner identical to that of Example 1.

The flameproofing tests on this yarn gave the following results:

| LOI | 25 |
| --- | --- |
| AATCC: length destroyed | 26 cm |
| Drip test: burning drips | yes |

The results indicate an improvement of the flame resistance relative to an unmodified polyethylene terephthalate (see Example 1B).

EXAMPLE 4 (comparative)

The procedure of Example 3 is repeated exactly, but with the addition of the phosponic compound to the charge. Interchange does not take place, and no polymer is obtained.

This example demonstrates that the phosphonic compound may only be added after the interchange has ended.

EXAMPLE 5

356.1 parts of dimethyl terephthalate, 310 parts of ethylene glycol, 0.28 part of anhydrous calcium acetate, and 0.16 part of antimony trioxide are introduced into a reactor equipped with the usual heating and regulating devices.

The mixture is heated to 216° C. whilst the methanol distils. At 220° C., a solution of 9.05 parts of tetraethyl paraphenylenediphosphonate of the formula:

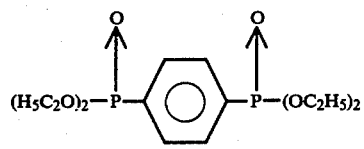

which is prepared in a known manner, in 50 parts of glycol, 20.25 parts of a 0.7% strength glycolic solution of phosphorous acid, and 43.5 parts of diol of the formula:

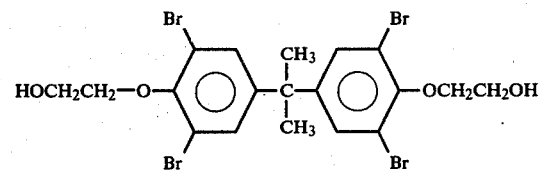

are added.

After 1 hour 25 minutes, at 255° C., distillation of the glycol has ended; a progressively higher vacuum is established, and the polycondensation is carried out for 15 minutes at 285° C. under a pressure of 0.7 mm Hg.

The copolyester thus obtained possesses the following characteristics:

| VI | 300 |
| --- | --- |
| Viscosity in the molten state at 275° C. | 5,600 Poises |
| Percentage of phosphorus | 0.41% |
| Percentage of bromine | 5.5% |

A yarn prepared with this copolymer, under the same conditions as in Example 1, exhibits the following characteristics when it is subjected to the flameproofing tests:

| LOI | 31 |
| --- | --- |
| AATCC: length destroyed | 15 cm |
| Drip test: burning drips | no |

EXAMPLE 6

The procedure of Example 5 is repeated, using 22.62 parts of the phosphonic compound and 39.54 parts of the brominated diol, the polycondensation being carried out for 30 minutes at 280° C. under a pressure of 0.7 mm Hg.

The copolymer thus obtained possesses the following characteristics:

| VI | 650 |
| --- | --- |
| Percentage of phosphorus | 0.96% |
| Percentage of bromine | 5% |

After spinning the drawing under the same conditions as in Example 1, the yarn, in the form of a knitted fabric, shows the following results in the flameproofing tests:

| | |
|---|---|
| LOI | 33 |
| AATCC: length destroyed | 10 cm |
| Drip test: burning drips | no |

EXAMPLE 7

A. Preparation of bis-(diethylphosphono)-4,4'-diphenylenesulphone 287 g of dichloro-4,4'-diphenylsulphone are introduced under pressure into a stainless steel autoclave equipped with a vertical stirrer and a dropping funnel. The system is purged with nitrogen, and the pressure is raised to 3 bars. The autoclave is heated to 190° C., and 400 g of triethyl phosphite are injected over a period of 3 hours by means of an injection pump. The pressure is kept at 3 bars by means of a microvalve through which the ethyl chloride formed escapes.

The mixture is left at 190° C. for 2 hours and cooled. After filtering off the unreacted dichloro-4,4'-diphenylsulphone and concentrating the filtrate in vacuo, a slightly yellow viscous liquid, bis-(diethylphosphono)-4,4'-diphenylenesulphone, is obtained as the residue.

B. Preparation of the copolymer 375 parts of dimethyl terephthalate, 310 parts of ethylene glycol, 0.28 part of anhydrous calcium acetate, and 0.16 part of antimony oxide are charged into a reactor equipped with the usual heating and regulating devices.

The methanol distils from 163° to 215° C. At 215° C., 31.67 parts of the compound prepared as in A above are introduced. Distillation of the glycol is observed between 217° C. and 250° C. 20.25 parts of a 0.7% strength solution of phosphorous acid in glycol, and 43.5 parts of the brominated diol of the formula:

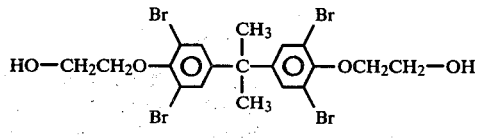

were added at 225° C. and 230° C., respectively.

At 250° C., a progressively higher vacuum is applied down to 1 mm Hg over a period of 30 minutes, whilst the temperature rises to 275° C., and the polycondensation is carried out over a period of 25 minutes under a pressure of 0.5 mm Hg.

The copolyester thus prepared possesses the following characteristics:

| | |
|---|---|
| VI | 690 |
| Viscosity in the molten stage at 275° C. | 1,400 Poises |
| Percentage of phosphorus | 3.24% |
| Percentage of bromine | 5.5% |

What is claimed is:

1. A copolyester which may be shaped and which has reduced flammability, and comprising 85 to 99.5% of repeating units of the formula:

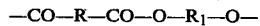

wherein the R radicals are derived from acid reactants, and in which 78.5 to 100% of the R radicals are selected from divalent aromatic paraphenylene and 2,6-naphthylene, 0 to 19.5 mol % relative to the sum of the radicals R are selected from the metaphenylene group and an aliphatic radical containing 6 to 12 carbon atoms, and 0 to 2 mol % relative to the sum of the radicals R are a trivalent or tetravalent radical derived from branching agents of acid character; 98 to 100% of the $R_1$ radicals are selected from the group consisting of divalent aliphtic, cycloaliphatic and cyclanic radicals and mixtures of two or more of these radicals, and 0 to 2% of the $R_1$ radicals are a trivalent or tetravalent radical derived from a branching agent of alcohol character; the sum of the trivalent or tetravalent radicals not exceeding 2 mol % relative to all the acid reactants;

at least 0.5% of units of the formula:

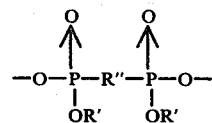

in which R' represents an alkyl radical containing 1 to 6 carbon atoms, and R" represents a divalent radical selected from an aliphatic group, one or more aromatic nuclei bonded in 1,4 position or fused, an aryl-aliphatic group containing one or more aromatic nuclei;

and 0 to 14.5% of units produced from a brominated compound of the formula:

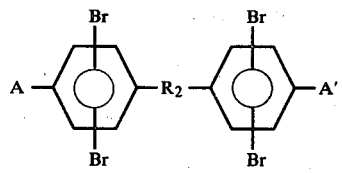

in which $R_2$ is a direct bond or represents an

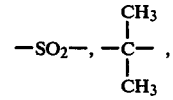

or —CH$_2$— or —O— group, and A and A' represent either —CO—OX groups, in which X=H or a lower alkyl group, or —X'—OH groups in which X'=a—(—OCH$_2$—CH$_2$—)$_n$ group and n=1 to 10.

2. A copolyester which may be shaped and which has reduced flammability, and comprising 85 to 96% of repeating units of the formula:

wherein the R radicals are derived from acid reactants and in which 78.5 to 100% of the R radicals are selected from divalent aromatic paraphenylene and 2,6-naphthylene, 0 to 19.5 mol % relative to the sum of the radicals R are selected from the metaphenylene group and an aliphatic radical containing 6 to 12 carbon atoms, and 0 to 2 mol % relative to all the acid reactants; R represents a trivalent or tetravalent radical derived from branching agents of acid character 2 to 10% of units of the formula:

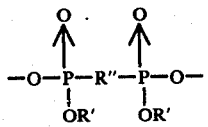

in which the various radicals have the same meanings as defined in claim 1;
and 2 to 8% of units produced from a brominated compound of the formula:

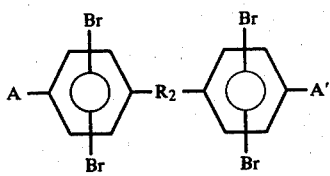

in which $R_2$ is a direct bond or represents an

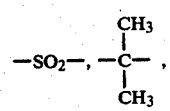

—$CH_2$—, or —O— group, and A and A' represent either —CO—OX groups, in which X=H or a lower alkyl group, or X'OH groups in which X'=a—$(OCH_2$—$CH_2)_n$ group and n=1 to 10.

3. A copolyester according to claim 1 characterized in that the group R is the group:

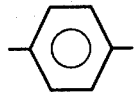

4. A copolyester according to claim 1 characterized in that the group $R_1$ is the group:

—$CH_2$—$CH_2$—

5. A copolyester according to claim 1 characterized in that the brominated compound is a diol of the formula:

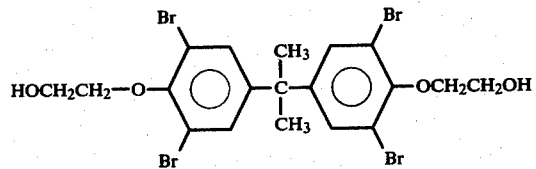

6. A copolyester according to claim 1 characterized in that the phosphonic unit has the formula:

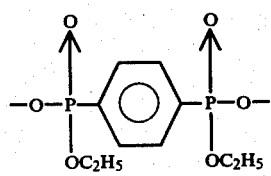

7. A copolyester having reduced flammability, according to claim 1 characterized in that the phosphonic unit has the formula:

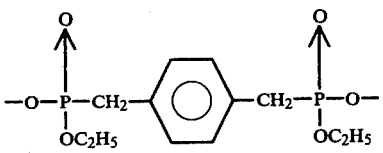

8. A copolyester having reduced flammability, according to claim 1 characterized in that the phosphonic unit has the formula:

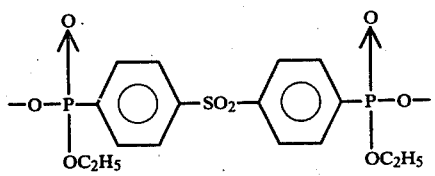

9. A shaped article having reduced flammability, such as a yarn, a fiber, a film and a molded or extruded article, when produced from a copolyester according to claim 1.

10. A copolyester as defined in claim 1, wherein the R" radical is an aliphatic radical containing 2 to 4 carbon atoms.

11. A copolyester as defined in claim 1, which includes one or more aromatic nuclei.

12. A copolyester as defined in claim 1, which includes an arylaliphatic group in which the aliphatic chain contains from 1 to 4 carbon atoms.

13. A copolyester as defined in claim 12, in which the aliphatic chain is branched.

14. A copolyester as defined in claim 1, which includes an arylaliphatic group in which the aliphatic chain contains heteroatoms.

15. A copolyester as defined in claim 14, in which the heteroatoms are O or $SO_2$.

16. A process for obtaining a copolyester as defined in claim 12, characterized in that the following are reacted in the presence of known catalysts:

80 to 99.5 mol %, relative to all the acid reactants, of an aromatic diacid selected among terephthalic acid and 2,6-naphthylenedicarboxylic acid;

0 to 19.5 mol %, relative to all the acid reactants, of another diacid selected from another aromatic diacid and an aliphatic diacid containing 8 to 14 carbon atoms;

85.5 to 100 mol % of one or more aliphatic, cycloaliphatic or cyclanic diols, and, added at any time during the reaction, 0 to 2 mol %, relative to all the acid reactants, of a trifunctional or tetrafunctional branching agent of acid or alcohol character;

at least 0.5 mol %, relative to all the acid reactants, of a compound of the general formula:

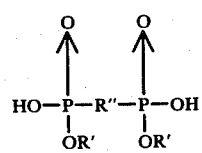

in which R' and R" have the same meanings as defined in claim 12;

and 0 to 14.5 mol %, relative to all the acid reactants, of a brominated compound of the general formula:

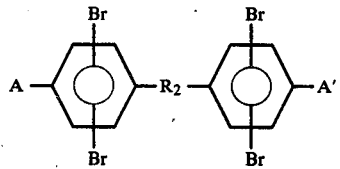

in which $R_2$ is a direct bond or represents an

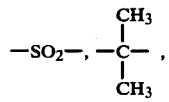

—$CH_2$— or —O— group, and A and A' are —COOH or —X'OH groups, X' representing a —(—$OCH_2CH_2$—)$_n$ group in which n=1 to 10;

and wherein the direct esterification is carried out at a temperature of at least 220° C. under a pressure at least equal to that necessary to maintain the glycol in the liquid state in the presence of the catalyst.

17. A process for obtaining a copolyester as defined in claim 1, characterized in that the following are reacted:

80 to 99.5 mol %, relative to all the acid or ester reactants, of a lower alkyl diester of an aromatic diacid such as terephthalic acid or 2,6-naphthylenedicarboxylic acid;

0 to 10.5 mol %, relative to all the acid or ester reactants, of another lower alkyl diester of another diacid selected from another aromatic diacid and an aliphatic diacid containing 8 to 14 carbon atoms;

85.5 to 100 mol %, relative to all the acid or ester reactants, of one or more aliphatic, cycloaliphatic or cyclanic diols, with the addition of 0 to 2 mol %, relative to all the acid or ester reactants, of trifunctional or tetrafunctional branching agent of acid, alcohol or ester character;

at least 0.5 mol %, relative to all the acid or ester reactants, of a compound of the general formula:

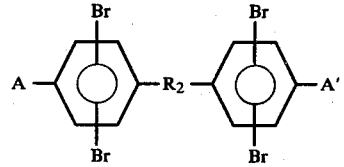

in which R' and R" have the same meanings as above, and R''' represents a hydrogen atom, or a lower alkyl group containing 1 to 6 carbon atoms;

and 0 to 14.5 mol %, relative to all the acid or ester reactants, or a brominated compound of the general formula:

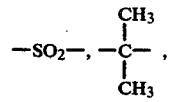

in which $R_2$ is a direct bond or represents an $$-SO_2-,\ -\underset{\underset{CH_3}{|}}{\overset{\overset{CH_3}{|}}{C}}-,$$

—$CH_2$— or —O— group, and A and A' are either —CO—OX groups, X representing a lower alkyl or H, or X'OH groups in which X'=a —(—O—$CH_2CH_2$—)$_n$ group and n=1 to 10;

followed by polycondensation in the usual manner, in the presence of known catalysts, the ester compounds being added at the start of the interchange, the acid compounds and the phosphonic compound being added at the end of the interchange, and the alcohol compounds being added at any time during the reaction; and wherein the interchange of esters is carried out at temperatures of at least 150° C. in the presence of a catalyst, and wherein after the addition of the acid and/or diol compounds, the reaction mixture is subjected to a progressively decreasing pressure while the temperature is progressively increased to at least 265° C.

* * * * *